United States Patent [19]

Yamamoto et al.

[11] Patent Number: 4,756,568
[45] Date of Patent: Jul. 12, 1988

[54] REAR WINDOWPANE WIPER STOWAGE

[75] Inventors: Takeshi Yamamoto; Takeshi Konishi; Iseo Hamasaki; Hisao Fukutomi, all of Hiroshima, Japan

[73] Assignee: Mazda Motor Corporation, Hiroshima, Japan

[21] Appl. No.: 24,594

[22] Filed: Mar. 11, 1987

[30] Foreign Application Priority Data

Mar. 20, 1986 [JP] Japan .................. 61-63779

[51] Int. Cl.⁴ ............................. B62D 37/02
[52] U.S. Cl. ...................... 296/1 S; 15/250.16; 15/250.17
[58] Field of Search ............ 296/1 S; 15/250.16, 15/250.17, 250.19, 250 R

[56] References Cited

U.S. PATENT DOCUMENTS 3,314,195  4/1967  Ziegler ................ 15/250.19

FOREIGN PATENT DOCUMENTS 2748874   5/1979   Fed. Rep. of Germany ...... 296/1 S
59-31549  2/1984   Japan .
59-182474 12/1984  Japan .
38236     2/1985   Japan ..................... 296/1 S
1071838   6/1967   United Kingdom .......... 15/250.19

Primary Examiner—Robert R. Song
Attorney, Agent, or Firm—Burns, Doane, Swecker & Mathis

[57] ABSTRACT

A rear windowpane wiper stowage system for an automobile comprises a rear windowpane, a rear spoiler secured to an automobile rear body structure in the vicinity of the rear windowpane, a rear wiper assembly having a wiper blade supported for movement back and forth across the windowpane and normally retained at a home position when the rear wiper assembly is not in use, a lid member hingedly mounted on the rear spoiler for movement between opened and closed positions for opening and closing the hatch, respectively, and a drive mechanism for driving the lid member from the closed position towards the opened position and also from the opened position towards the closed position when the rear wiper assembly is used and not used, respectively. The rear spoiler has a hollow defined in at least a portion thereof and also has a hatch defined therein in communication with the hollow in the vicinity of the rear windowpane. The wiper blade held at the home position when the wiper assembly is not in use is completely accommodated within the hollow in the rear spoiler, but is exposed to the outside through the hatch for sweeping the rear windowpane back and forth across the rear windowpane when the wiper assembly is in use.

14 Claims, 3 Drawing Sheets

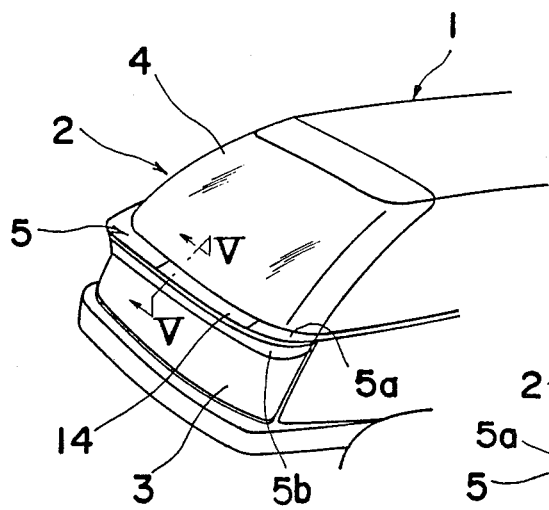
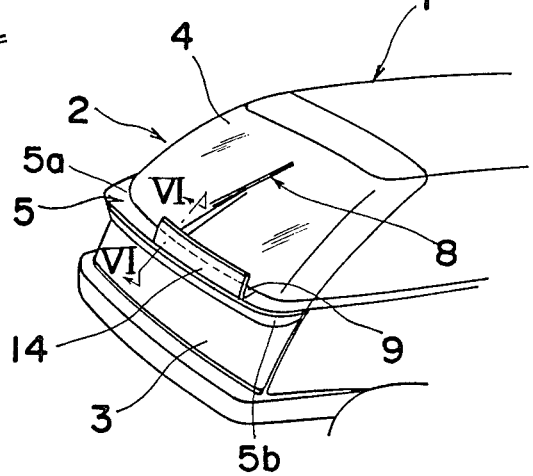
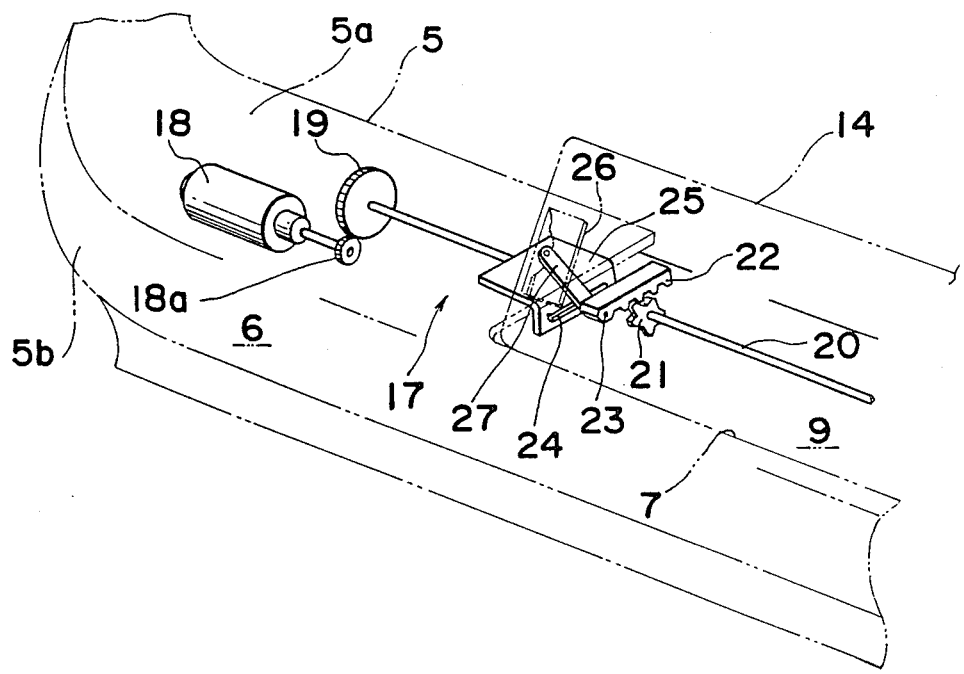

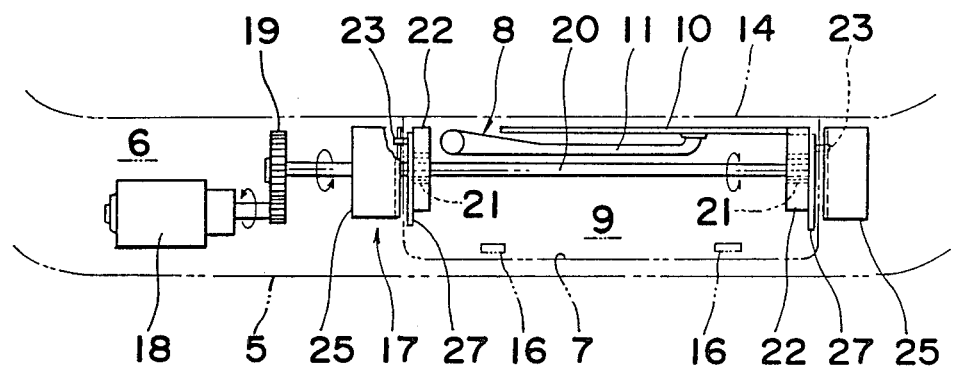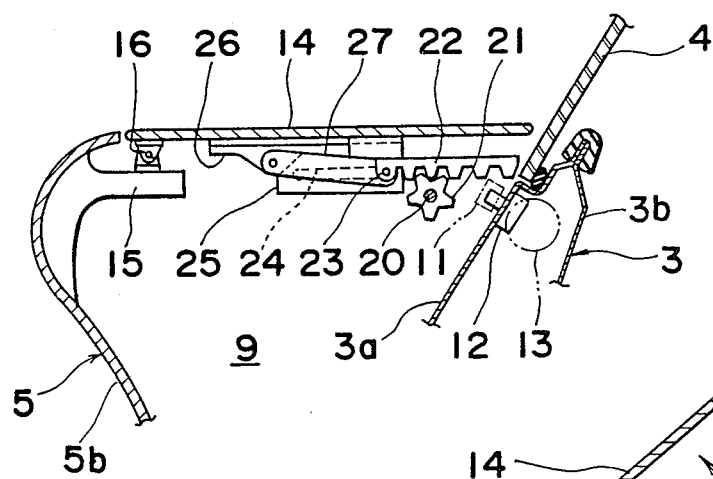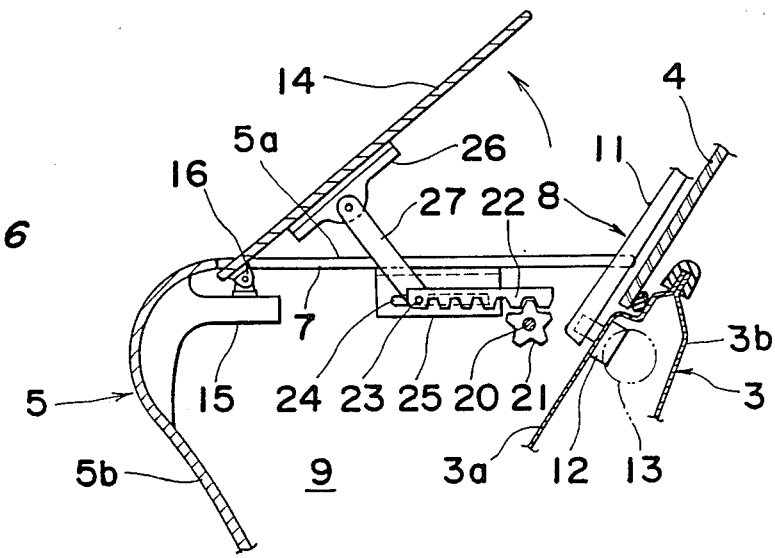

_4,756,568_

REAR WINDOWPANE WIPER STOWAGE

BACKGROUND OF THE INVENTION

The present invention generally relates to an automobile windowpane wiper assembly and, more particularly, to a stowage system for concealing the rear windowpane wiper assembly when the latter is not in use.

The use of a rear windowpane wiper assembly in an automobile is now popular. For example, the Japanese Laid-open Utility Model Publication No. 59-31549, published Feb. 27, 1984, discloses the use of the rear windowpane wiper assembly installed adjacent either the lower edge or the upper edge of the rear windowpane for sweeping rain drops off the rear windowpane. According to this publication, the windowpane itself constitutes a rear hatch cover hingedly connected to a rear end portion of the automobile roof and, therefore, unique design has been made to enable the wiper blade and its associated link mechanism, where the rear windowpane wiper assembly is installed to the rear end of the automobile roof, to pivot in a direction conforming to the direction of pivot of the rear windowpane.

In any event, much design improvement has hitherto been made to render the front windshield wiper assemblies to be attractive in such a way as to conceal them within a space delimited between the lower edge of the front windshield and the hood and beneath the level of the hood when the front windshield wiper assemblies are not in use. However, when it comes to the rear windowpane wiper assembly, the use of which is now increasing in most automobiles, it is usual for the rear windowpane wiper assembly to be exposed to the outside at all times with no exception to the rear windowpane wiper assembly disclosed in the above mentioned publication. The rear windowpane wiper assembly exposed to the outside does not only provide an obstruction to the streamlined flow of air which often constitutes a cause of wind noise, but also affect the steerability of the automobile in view of the increased air resistance. Moreover, the exposure of the rear windowpane wiper assembly at all times adversely affects the appearance of the automobile body.

On the other hand, although it has no concern with the windowpane wiper assembly, the use of a rear spoiler is also increasing now such as disclosed in the Japanese Laid-open Utility Model Publication No. 59-182474 published Dec. 5, 1984. The rear spoiler is, as is well understood by those skilled in the art, used to decrease lift which would act on the rear portion of the automobile and to concentrate a downward force on the rear wheels through the rear portion thereof. The rear spoiler disclosed in this publication is generally in the form of a blade and supported for movement between folded and erected position.

SUMMARY OF THE INVENTION

The present invention has been devised to provide a rear windowpane stowage system for concealing the rear windowpane wiper assembly from the sight when it is not in use, without requiring the use of any housing or casing specifically designed for the rear windowpane wiper assembly and, therefore, without adversely affecting the attractive appearance of the automobile body.

Another important object of the present invention is to provide the rear windowpane stowage system utilizing, or "borrowing", a portion of the rear spoiler for the accommodation of the rear windowpane wiper assembly when the latter is not in use.

In order to accomplish these objects of the present invention, the rear windowpane wiper stowage system herein disclosed comprises a rear windowpane, a rear spoiler secured to an automobile rear body structure in the vicinity of the rear windowpane, a rear wiper means having a wiper blade assembly supported for movement back and forth across the windowpane and normally retained at a home position when the rear wiper means is not in use, a lid member hingedly mounted on the rear spoiler for movement between opened and closed positions for opening and closing the hatch, respectively, and a drive means for driving the lid member from the closed position towards the opened position and also from the opened position towards the closed position when the rear wiper means is used and not used, respectively.

The rear spoiler has a hollow defined in at least a portion thereof and also has a hatch defined therein in communication with the hollow in the vicinity of the rear windowpane. The wiper blade assembly held at the home position when the wiper means is not in use is completely accommodated within the hollow in the rear spoiler, but is exposed to the outside through the hatch for sweeping the rear windowpane back and forth across the rear windowpane when the wiper means is in use.

The rear spoiler used in the practice of the present invention is not necessitated only for the purpose of the rear windowpane wiper assembly. However, the rear windowpane wiper stowage system according to the present invention makes use of, or "borrows", a portion of the rear spoiler and can therefore be accomplished with a minimized number of component parts and with no need to prepare any extra housing or casing only for the rear windowpane wiper assembly. Notwithstanding, the performance of the rear spoiler will not be adversely affected since the lid in the closed position with the rear wiper assembly accommodated within the stowage compartment is held flush with an exterior surface of that portion of the rear spoiler. Moreover, the aesthetic feature of the automobile body structure will not be adversely affected.

BRIEF DESCRIPTION OF THE DRAWINGS

These and other objects and features of the present invention will become clear from the following description taken in conjunction with a preferred embodiment thereof with reference to the accompanying drawings, in which:

FIG. 1 is a perspective view of a rear portion of an automobile, showing a rear wiper not in use;

FIG. 2 is a view similar to FIG. 1, showing the rear wiper in use;

FIG. 3 is a perspective view, on an enlarged scale, showing a lid drive mechanism for selectively opening and closing a lid forming a part of a rear spoiler;

FIG. 4 is a top plan view of the lid drive mechanism shown in FIG. 3;

FIGS. 5 and 6 are cross-sectional views, on an enlarged scale, taken along the lines V—V and VI—VI in FIGS. 1 and 2, respectively;

DETAILED DESCRIPTION OF THE EMBODIMENT

Figure 7:
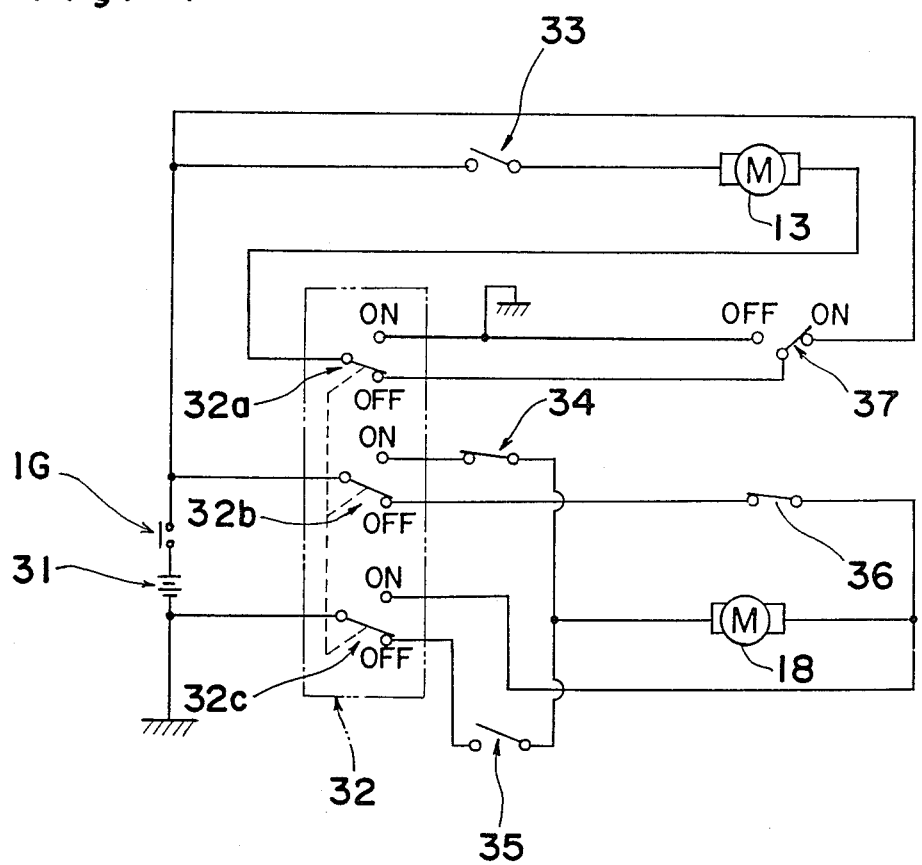
FIG. 7 is an electric circuit diagram showing an electric circuit for the lid drive mechanism in association with a drive motor for the rear wiper.

Referring now to the accompanying drawings and particularly to FIGS. 1 and 2, an automobile body structure 1 is shown to be of a hatchback style having a rear access opening which is defined at the rear thereof and which is adapted to be selectively opened and closed by a hingedly supported rear door assembly 2. So far shown, the rear door assembly 2, being of a generally rectangular shape, comprises a generally double-walled door panel 3 having rigidly secured thereto a skeletal frame of a shape generally similar to the inverted shape of a figure "U", and a rear windowpane 4 retained in position above the door panel 3 by means of the skeletal frame. The door assembly 2 is hingedly connected to the rearmost edge portion of a roof panel of the body structure 1 through a transversely extending upper portion of the skeletal frame rigid with the door panel 3. The rear windowpane 4 is so shaped and so curved as to permit its opposite side portions to cover opposite side frame portions of the skeletal frame while protruding a distance generally in a direction towards the front of the body structure 1.

A rear spoiler generally shown by 5 in the illustrated embodiment, is exteriorly secured rigidly to the door panel 3 so as to extend widthwise of the door assembly 2 and positioned adjacent, and generally in parallel relation to, a lower edge portion of the windowpane 4. The rear spoiler 5 has a generally U-shaped cross-section opening towards an outer panel portion 3a of the door panel 3 as shown in FIGS. 5 and 6 and is comprised of a generally flat deck region 5a lying generally in a horizontal plane and a generally downwardly extending, curved corbel region 5b continued from the deck region 5a and terminating in contact with the outer panel portion 3a of the door panel 3, leaving a hollow 6 delimited by the rear spoiler 5 and the door panel 3. As best shown in FIGS. 5 and 6, with the rear spoiler 5 so secured to the door panel 3, the flat deck region 5a thereof is located at a level higher a predetermined distance above the level where the lower edge portion of the rear windowpane 4 is located.

Referring to FIGS. 3 to 6, a portion of the flat deck region 5a of the rear spoiler 5 which is intermediate of the width of the door assembly 2 or the length of the rear spoiler 5 is cut away from the flat deck region 5a to provide a generally rectangular lid 14 while leaving a correspondingly shaped hatch 7 in the flat deck region 5a. As will become clear from the subsequent description, a portion of the hollow 6 delimited by the rear spoiler 5 and the door panel 3, which lies in alignment with the hatch 7, is utilized as a wiper stowage compartment 9 for accommodating a rear wiper assembly generally identified by 8.

The rear wiper assembly 8 may be substantially identical in construction and function with any known automobile front windshield wiper assembly and comprises a wiper blade 10, a wiper link assembly 11 articulated at one end to a substantially intermediate portion of the wiper blade 10, a wiper pivot assembly 12 carried to the outer panel portion 3a of the door assembly 3, and a wiper motor 13 carried by the door assembly 3 and positioned within a space delimited between the outer panel portion 3a and an inner panel portion 3b of the door assembly 3. The wiper pivot assembly 12 includes a pivot shaft having its opposite ends situated on respective sides of the outer panel portion 3a, one end being drivingly connected with the other end of the link assembly 11 within the wiper storage compartment 9 while the other end thereof is drivingly coupled with the wiper motor 13. As is the case with the known front windshield wiper assembly, the rear wiper assembly 8 employed in the practice of the present invention is so designed and so operable that, during the operation of the wiper motor 13, the wiper blade 10 can be driven back and forth across the rear windowpane 4, but when the wiper motor 13 is brought to a halt, the wiper assembly 10 can be brought to a home position at which it lies generally horizontally and generally parallel to the lower edge portion of the rear windowpane 4 together with the wiper link assembly 11 as shown in FIGS. 4 and 5.

As best shown in FIGS. 5 and 6, the rear spoiler 5 has a hinge mount 15 secured to, or otherwise formed integrally with, the rear spoiler 5 so as to protrude inwardly of the wiper stowage compartment 9 from a curved joint between the flat deck region 5a and the curved corbel region 5b. The rectangular lid 14 has one side portion pivotally mounted on the hinge mount 15 by means of one or more, for example, two hinges 16 for selectively opening and closing the hatch 7, said lid 14 when in a closed position closing the hatch 7 while lying flush with the deck region 5a of the rear spoiler 5 as shown in FIGS. 1 and 5. However, the lid 14, when pivoted to an opened position, opens the hatch 7 while lying at a predetermined angle relative to the deck region 5a as shown in FIGS. 2 and 6, said predetermined angle being so selected as to permit the opposite side of the lid 14 remote from the hinges 16 to be spaced from the rear windowpane 4 a distance enough to accommodate the movement of the wiper blade assembly 10 together with the wiper link assembly 11. The pivotal movement of the lid 14 between the opened and closed positions about the hinge axis defined by the hinges 16 is effected by a drive system, generally identified by 17, which will now be described with particular reference to FIGS. 3 to 6.

The drive system 17 comprises an electrically operated, reversible drive motor 18 supported in position within the hollow 6 in the rear spoiler 5 at a location offset from the wiper stowage compartment 9 in a direction lengthwise of the rear spoiler 5, and a drive gear 18a rigidly mounted on a drive shaft of the drive motor 18. The drive system 17 also comprises a linkage shaft 20 supported for rotation about its own longitudinal axis within the hollow 6 so as to extend across the length of the hatch 7 and in a direction conforming to the widthwise direction of the body structure 1 and having three gears rigidly mounted thereon for rotation together therewith. One of the gears on the linkage shaft 20 is a driven gear 19 located at one end of the shaft 20 and constantly meshed with the drive gear 18a, and the remaining two gears on the linkage shaft 20 are pinion gears 21 located at the opposite end of the shaft 20 and a substantially intermediate end of the shaft 20. The pinion gears 21 are spaced a distance corresponding to the length of the hatch 7 and positioned adjacent the opposite ends thereof, respectively.

Generally L-sectioned brackets 25 each having a guide slot 24 defined therein are secured from below to the deck region 5a of the rear spoiler 5 adjacent the opposite ends of the hatch 7 with the respective guide slots 24 confronting with each other while extending in a direction widthwise of the rear spoiler 5 or in a direction parallel to the longitudinal sense of the body structure 1. Each of the brackets 25 supports a respective rack member 22 through a guide pin 23 having one end rigid with the rack member 22 and the other end movably received in the associated guide slot 24, whereby the respective rack member 22 can move in a direction parallel to the lengthwise direction of the associated guide slot 24.

The rack members 22 are constantly meshed with the respective pinion gears 21 on the linkage shaft 20 and, on the other hand, operatively coupled with the lid 14 by means of respective arms 27. Each of the arms 27 has one end pivotally connected with the respective guide pin 23 and positioned between the associated rack member 22 and the associated bracket 25, and the other end pivotally connected to the lid 14 through a hinge bracket 26. The hinge brackets 26, one for each arm 27, are rigidly secured to respective opposite ends of the lid 14 and positioned inwardly of the contour of the lid 14 so that they will not interfere with the associated brackets 25 when the lid 14 is in the closed position.

The linkage system, including the rack members 22, the arms 27 and the brackets 25 and 26, is so designed and so positioned that when the lid 14 is pivoted to the closed position as shown in FIGS. 1 and 5, the lid 14 can be held flush with the generally flat deck region 5a of the rear spoiler 5.

While the rear windowpane wiper stowage according to the present invention is constructed as hereinabove described, the following electric control circuit is employed for controlling the pivotal movement of the lid 14 in association with the drive motor 13 for the rear wiper assembly 8.

Referring to FIG. 7, the control circuit shown therein includes a gang switch assembly 32 comprised of three gang switches 32a, 32b and 32c, each having a movable contact and ON and OFF position contacts, a source of electric power 31 which may be a battery used in an automobile in general, and first to fifth switches, 33, 34, 35, 36 and 37. The gang switch assembly 32 is adapted to be manipulated by a driver of the automobile and assumes an OFF position when and so long as the driver does not use the wiper assembly 8 as will be described later, all of the movable contacts of the respective gang switches 32a to 32c being engaged to the respective OFF position contacts when the gang switch assembly 32 is in the OFF position as shown.

The first switch 33 is utilized to detect the movement of the lid 14 from the closed position to the opened position and is adapted to be closed simultaneously with or shortly after the arrival of the lid 14 at the opened position. Therefore, when the gang switch assembly 32 assumes an ON position wherein all of the movable contacts of the gang switches 32a to 32c are engaged with the respective ON position contacts, and the first switch 33 is subsequently closed in response to the arrival of the lid 14 at the opened position, the wiper drive motor 13 can be driven to move the wiper blade 10 back and forth across the rear windowpane 4.

The second switch 34 is a detector switch similar to the first switch 33, but operates in a sense opposite thereto. In other words, the second switch 34 is normally closed when and so long as the lid 14 is in the closed position, but is opened in response to the arrival of the lid 14 at the opened position to interrupt the supply of the electric power to the lid drive motor 18 through the gang switch 32b.

The third switch 35 operates in a sense substantially opposite to the second switch 34 and is closed in response to the start of movement of the lid 14 from the opened position towards the closed position, but opened in response to the arrival thereof at the closed position to interrupt the supply of the electric power to the lid drive motor 18 through the gang switch 32c. It is to be noted that the supply of the electric power to the lid drive motor 18 through the gang switch 32b and then through the second switch 34 results in the drive of the lid drive motor 18 in one direction required to move the lid 14 from the closed position towards the opened position, whereas the supply of the electric power to the same lid drive motor 18 through the gang switch 32c and then through the third switch 35 results in the drive of the lid drive motor 18 in the opposite direction required to move the lid 14 from the opened position towards the closed position.

The fourth switch 36 is used for detecting the return of the wiper blade 10 to the home position subsequent to the manipulation of the gang switch 32 so as to assume the OFF position. This fourth switch 36 is adapted to be closed in response to the return of the wiper blade 10 to the home position with the wiper assembly 8 consequently accommodated completely within the storage compartment 9. When this fourth switch 36 is so closed, and assuming that the gang switch assembly has been in the OFF position, the lid drive motor 18 can be driven in said opposite direction to move the lid 14 from the opened position towards the closed position.

The fifth switch 37 so far shown has a movable contact in combination with ON and OFF position contacts and is so operable that the movable contact can be engaged to the OFF position contact, when the gang switch assembly 32 is moved to the OFF position, to permit the wiper drive motor 13 to be kept in operation until the wiper blade 10 returns to the home position, but can be engaged to the ON position contact when the wiper blade 10 completely returns to the home position, thereby to bring the wiper drive motor 13 to a halt.

Reference character IG represents an automobile ignition switch.

The rear windowpane wiper stowage system operates in the following manner.

Let it be assumed that the wiper blade 10 is held at the home position and consequently accommodated completely within the wiper stowage compartment 9 with the lid 14 held in the closed position as shown in FIGS. 1 and 5 and that the automobile ignition switch IG is closed. At this time, the various switches 32 to 37 used in the control circuit of FIG. 7 are so conditioned as shown. More specifically, the gang switch assembly 32 is held in the OFF position. The switches 33 and 35 are opened, the switches 34 and 36 are closed, and the movable contact of the switch 37 is engaged to the ON position contact.

When the automobile driver eventually wishes to use the wiper assembly 8 and, therefore, manipulates the gang switch assembly 32 to move the latter to the ON position, the electric power from the source 31 thereof is supplied through the second switch 34 to the lid drive motor 18 to drive the latter in said one direction, causing the lid 14 in the closed position to pivot towards the opened position while the third switch 35 is closed. As shown in FIGS. 3 and 6, when the lid drive motor 18 is so driven in said one direction, the linkage shaft 20 is driven in a counterclockwise direction as viewed in FIG. 6, moving the rack members 22 in a direction away from the door assembly 2 while accompanied by a clockwise pivotal movement, as viewed in FIG. 6, of the arms 27. Therefore, the lid 14 is pivoted about the hinge axis, defined by the hinges 16, from the closed position towards the opened position.

Upon the arrival of the lid 14 at the opened position, the second switch 34 is opened to interrupt the supply of the electric power therethrough to the lid drive motor 18. Shortly before, simultaneously with, or shortly after the arrival of the lid 14 at the opened position, the first switch 33 is closed to effect the electric power supply therethrough to the wiper drive motor 13. In this way, the wiper drive motor 13 is brought into operation to move the wiper blade 10 back and forth across the rear windowpane 4 thereby to sweep rain drops off the windowpane 4.

In order for the lid 14 in the opened position to be pivoted to the closed position so that the wiper assembly 8 with the wiper blade 10 held in the home position can be concealed within the storage compartment 9, all that the automobile driver has to do is to move the gang switch assembly 32 to the OFF position. More specifically, the movement of the gang switch assembly 32 from the ON position to the OFF position is accompanied by the switching of the movable contact of the fifth switch 37 from the ON position contact onto the OFF position contact to permit the continued supply of the electric power to the wiper drive motor 13, even though the movable contact of the gang switch 32a has been disengaged from the ON position contact, so that the wiper blade 10 can be brought to the home position. At the same time, fourth switch 36 is opened incident to the switching of the gang switch assembly 32 to the OFF position and, therefore, the lid drive motor 18 is not driven.

Upon the arrival of the wiper blade 10 to the home position with the wiper assembly 8 accommodated completely within the stowage compartment 9, the movable contact of the fifth switch 37 is brought into engagement with the ON position contact, thereby isolating the wiper drive motor 13 from the electric power source 31 to bring the wiper drive motor to a halt. Shortly before, simultaneously with or shortly after the arrival of the wiper blade 10 at the home position, the fourth switch 36 is closed to initiate the supply of the electric power to the lid drive motor 18 through the gang switch 32b and then through the closed fourth switch 36 thereby to drive the lid drive motor 18 in the opposite direction required to move the lid 14 from the opened position towards the closed position. In response to the start of the movement of the lid 14 from the opened position towards the closed position, the first and second switches 33 and 34 are opened and closed, respectively.

Upon the arrival of the lid 14 at the closed position with the wiper assembly 8 consequently concealed within the stowage compartment 9 while the hatch 7 is closed thereby, the third switch 35 is opened to interrupt the electric power supply to the lid drive motor to bring the latter to a halt.

Figure 8:
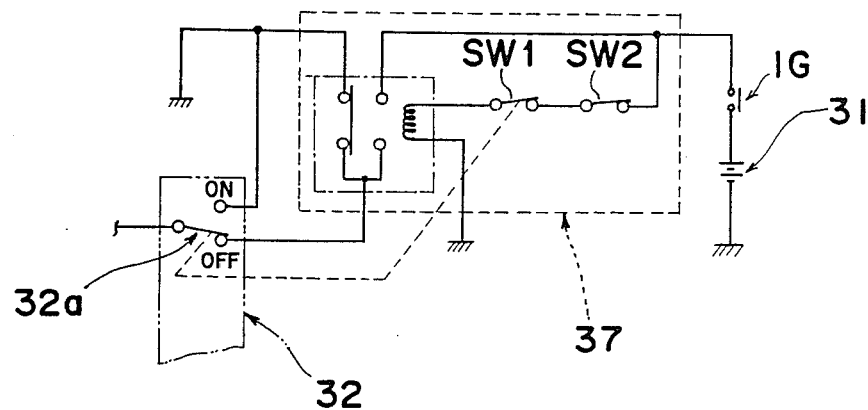
FIG. 8 is a diagram showing one of the switches shown in FIG. 7, which can be commercially embodied in a simple manner.

The fifth switch 37 has been described as having the movable contact engageable with the OFF position contact in response to the switching of the gang switch assembly 32 from the ON position to the OFF position, but engageable with the ON position contact in response to the arrival of the wiper blade 10 at the home position. In practice, this fifth switch 37 is embodied by the use of a relay switch 40 and series-connected switches SW1 and SW2 as shown in FIG. 8. The switch SW1 is operatively associated or ganged with the gang switch assembly 32 so that it can be closed and opened when the gang switch assembly 32 is switched onto the OFF position and onto the ON position, respectively. On the other hand, the switch SW2 is closed and opened in response to the arrival of the wiper blade 10 to the home position and in response to the movement of the wiper blade 10 away from the home position, respectively. The relay switch 40 is so designed that, assuming that the ignition switch IG is turned on, the switching of the gang switch assembly to the ON position can result in the connection of the OFF position contact of the gang switch 32a to the ground, but the switching of the gang switch assembly 32 to the OFF position results in the energization of a relay coil 40a by which the OFF position contact of the gang switch 32a is connected to the electric power source 31. The actual connection of the OFF position contact of the gang switch 32a resulting from the energization of the relay coil 40a, that is, the closure of the switch SW2, takes place when the wiper blade 10 has been returned to the home position.

From the foregoing description, it has now become clear that, when and so long as the rear windowpane wiper assembly 8 is not in use, the lid 14 is held flush with the flat deck region 5a of the rear spoiler 5 while concealing the wiper blade 10 completely within the stowage compartment 9 as if the automobile were not equipped with the rear windowpane wiper assembly. Therefore, the rear windowpane wiper stowage system according to the present invention is effective not only to minimize, or substantially eliminate, any possible reduction of the aesthetic feature of the automobile body structure, particularly a rear portion thereof, but also to minimize a resistance to the streamlined flow of air along the rear windowpane which would be unnecessarily brought about if the rear wiper assembly is exposed at all times.

Moreover, the rear spoiler referred to in the illustrated embodiment of the present invention is, as is well understood by those skilled in the art, used to decrease lift which would act on the rear portion of the automobile and to concentrate a downward force on the rear wheels through the rear portion thereof. The rear spoiler is not necessitated for the purpose of the rear windowpane wiper assembly. However, the rear windowpane wiper stowage system according to the present invention makes use of, or "borrows", a portion of the rear spoiler of the type referred to above and can therefore be accomplished with a minimized number of component parts and with no need to prepare any extra housing or casing only for the rear windowpane wiper assembly. Notwithstanding, the performance of the rear spoiler will not be adversely affected since, as hereinabove described, the lid in the closed position with the rear wiper assembly accommodated within the stowage compartment is held flush with the deck region of the rear spoiler.

Although the present invention has been fully described in connection with the preferred embodiment thereof with reference to the accompanying drawings, it is to be noted that various changes and modifications are apparent to those skilled in the art. By way of example, although the control circuit has been shown and described as having the numerous mechanical switches, a programmable microcomputer may be utilized for controlling the wiper drive motor 13 and the lid drive motor 18 in the required sequence and in the required timed relationship. Moreover, the illustrated control circuit may be utilized for controlling both the rear windowpane wiper assembly and the front windshield wiper assembly if a wiper drive motor for the front windshield wiper assembly is connected parallel to the wiper drive motor for the rear windowpane wiper assembly.

Furthermore, the rear door assembly 2 to which the present invention is applicable may not be so designed and so structured as hereinbefore described. For example, the rear door assembly 2 may have no windowpane support skeletal frame used to retain top and side edges of the windowpane. Alternatively, what has been referred to as the double-walled door panel 3 may be an integral part of the automobile body structure 1, in which case the windowpane 4 may be supported either hingedly in a manner similar to that described above or for movement up and down.

Yet, although reference has been made to the rear door assembly having the rear spoiler rigidly secured thereto exteriorly, the present invention can be equally applicable to the automobile body structure having a rear window and a rear end wall rigid with opposite side panels of the body structure. In such case, the rear spoiler may be secured to the roof panel adjacent and immediately above the rear window, and the wiper stowage system of the present invention may be provided in the rear top spoiler.

Also, instead of the electrically operated motor for the lid drive motor, an electromagnetic motor such as a solenoid unit, may be employed. Where the electromagnetic motor of a type having a retractable plunger is employed, the rack and pinion linkage system may be obviated if desired and, instead, the retractable plunger forming a part of the electromagnetic motor may be operatively coupled direct with the lid.

Accordingly, such changes and modifications are to be understood as included within the scope of the present invention as defined by the appended claims unless they depart therefrom.

What is claimed is:

1. A rear windowpane wiper stowage arrangement in an automobile having a rear windowpane, comprising:
   an automobile rear body structure in the vicinity of the rear windowpane, said rear body structure having a hollow defined in at least a portion thereof and also having a hatch defined therein in communication with the hollow in the vicinity of the rear windowpane;
   a rear wiper means having a wiper blade assembly supported for movement back and forth across the windowpane and retained at a home position when the rear wiper means is not in use, said wiper blade assembly at the home position being completely accommodated within the hollow, but exposed to the outside through the hatch for sweeping the rear windowpane back and forth across the rear windowpane when the wiper means is in use;
   a lid member mounted on the rear body structure for movement between opened and closed positions for opening and closing the hatch, respectively; and
   a lid drive means including an actuator for driving the lid member from the closed position towards the opened position and also from the opened position towards the closed position when the rear wiper means is used and not used, respectively, and a control unit for applying a control signal to the actuator, the actuator including an electrically operated motor, a linkage system for translating a rotary motion of the motor into a linear motion and said linkage system including a rack and a pinion rotatable together with the motor, and a link mechanism for transmitting the linear motion of the rack to the lid member.

2. The wiper stowage as claimed in claim 1, wherein the lid member when in the closed position has an exterior surface flush with an exterior surface of the rear body structure around the hatch to facilitate a smooth flow of air.

3. The wiper stowage as claimed in claim 1, wherein an upper surface area of the rear body structure is located at a level higher than a lower edge of the windowpane.

4. The wiper stowage as claimed in claim 1, further comprising a hinge mount secured to the rear body structure and positioned inside the hollow adjacent the hatch, said lid member having one edge portion hingedly connected to the rear body structure through said hinge mount.

5. The wiper stowage as claimed in claim 1, wherein the actuator is fixedly housed within the hollow of the rear body structure.

6. The wiper stowage as claimed in claim 1, wherein the control unit, when receiving an enabling command for activating the wiper means, generates a signal to drive the lid member from the closed position towards the opened position, said control unit also operable to cause the wiper means to start operation when the lid member is moved completely to the opened position.

7. The wiper stowage as claimed in claim 1, wherein the control unit is, when receiving a disabling command inactivating the wiper means, operable to cause the wiper means to return the wiper blade assembly to the home position, said control means also operable to generate a signal necessary to drive the lid member from the opened position towards the closed position.

8. The wiper stowage as claimed in claim 1, wherein the rear body structure is positioned generally parallel to and adjacent a lower edge of the rear windowpane.

9. A rear windowpane wiper stowage arrangement in an automobile having a rear windowpane, comprising:
   an automobile rear body structure in a region adjacent the rear windowpane, said rear body structure including a generally double wall rear end structure having an opening, the rear window pane fitted to the rear body structure to close the opening;
   a rear wiper means having a wiper blade assembly supported for movement back and forth across the windowpane and retained at a home position when not in use, said rear wiper means including a wiper drive motor housed in a space defined between outer and inner panels forming the double wall rear end structure and the wiper blade assembly positioned exteriorly of the inner panel;
   a lid member mounted on the rear body structure for movement between opened and closed positions for opening and closing the space;
   lid drive means including an actuator for selectively driving the lid member between said opened and closed positions, said lid drive means positioned within the double wall rear end structure; said actuator including an electric motor and a linkage system for translating a rotary motion of said electric motor into a linear motion, said linkage system including a rack and pinion rotatable with the electric motor, and a link mechanism transmitting the linear motion from the rack to the lid member; and
a rear spoiler secured to said rear body structure along a peripheral edge region of the rear windowpane.

10. A rear windowpane stowage space arrangement in an automobile having a rear windowpane, comprising:
an automobile rear body structure including a generally double wall rear end structure having inner and outer panels and an opening, the rear windowpane fitted to the rear body structure to close the opening;
a lid member mounted on the rear body structure for movement between opened and closed positions for opening and closing the space, the lid member in a closed position having an exterior surface flush with an exterior surface of the rear body structure to facilitate a smooth flow of air;
a lid member mounted on the rear body structure for movement between opened and closed positions;
a lid drive means including an actuator for driving the lid member between said opened and closed positions, said actuator including an electric motor and a linkage system for translating a rotary motion of said electric motor into a linear motion, said linkage system including a rack and pinion rotatable with the electric motor, and a link mechanism transmitting the linear motion from the rack to the lid member; and
a rear spoiler secured to said rear body structure along the outer panel, said lid drive means being positioned in the space with the space defined between the rear spoiler and the outer panel of the rear end structure.

11. The wiper stowage as claimed in claim 9, wherein the lid member when in the closed position has an exterior surface flush with an exterior surface of the rear body structure around the hatch to facilitate a smooth flow of air.

12. The wiper stowage as claimed in claim 9, wherein an upper surface area of the rear body structure is located at a level higher than the level at which a lower edge of the windowpane.

13. The wiper stowage as claimed in claim 9, further comprising a hinge mount secured to the rear body structure and positioned inside the hollow adjacent the hatch, said lid member having one edge portion hingedly connected to the rear body structure through said hinge mount.

14. The wiper stowage as claimed in claim 9, wherein the rear body structure is positioned generally parallel to and adjacent a lower edge of the rear windowpane.

* * * * *